Nov. 25, 1930.  H. M. EDMUNDS ET AL  1,782,756
CHANGE SPEED GEAR
Filed April 27, 1929

Inventors,
Howard Maurice Edmunds,
Edward Hileman Waring,
By Samuel W. Balch
Attorney.

Patented Nov. 25, 1930

1,782,756

UNITED STATES PATENT OFFICE

HOWARD MAURICE EDMUNDS, OF NEW YORK, N. Y., AND EDWARD HILEMAN WARING, OF ESSEX FELLS, NEW JERSEY, ASSIGNORS TO CROCKER-WHEELER ELECTRIC MANUFACTURING COMPANY, OF AMPERE, NEW JERSEY, A CORPORATION OF NEW JERSEY

CHANGE-SPEED GEAR

Application filed April 27, 1929. Serial No. 358,448.

This invention relates particularly to friction gearing of the type set forth in U. S. patent to Charles George Garrard, No. 1,709,345, dated April 16, 1929, with a central roller and satellite rollers in engagement with the central roller, the satellite rollers having beveled surfaces arranged in opposed pairs, an outer race in two parts, one of which is in engagement with one of the beveled faces and the other of which is in engagement with the other beveled face of each of the satellite rollers, and connections between the parts of the outer race by which they have concurrent relative rotative adjustment and relative adjustment in the direction of their axes whereby rotative force communicated to the outer race in the transmission of power through the gearing tends to axially displace the parts of the outer race and increase the pressures between them and the beveled faces of the satellite rollers.

According to this invention in change speed gears of the type above defined, the means for restraining the outer race as a whole from rotating is a means applied to one of the parts of the outer race which holds it in a plane at right angles to the axis of the apparatus and restrains it from rotation while permitting a slight substantially parallel displacement of its axis.

The object of this invention is to provide a means for reducing or even eliminating the bad effects resulting from slight eccentricities or lack of symmetry of the parts, such as a lack of uniformity in the diameters of the satellite rollers. A further object is to provide a means with which it is not essential that flanges be provided on the central shaft in engagement with the ends of the satellite rollers to take care of end thrusts between these parts. These objects are attained by providing certain freedoms of movement in connection with the restraints required for the outer race, but the specific construction herein shown for obtaining these freedoms and restraints is not essential to this invention.

In the accompanying sheet of drawings which forms a part of this description,

Figure 1:
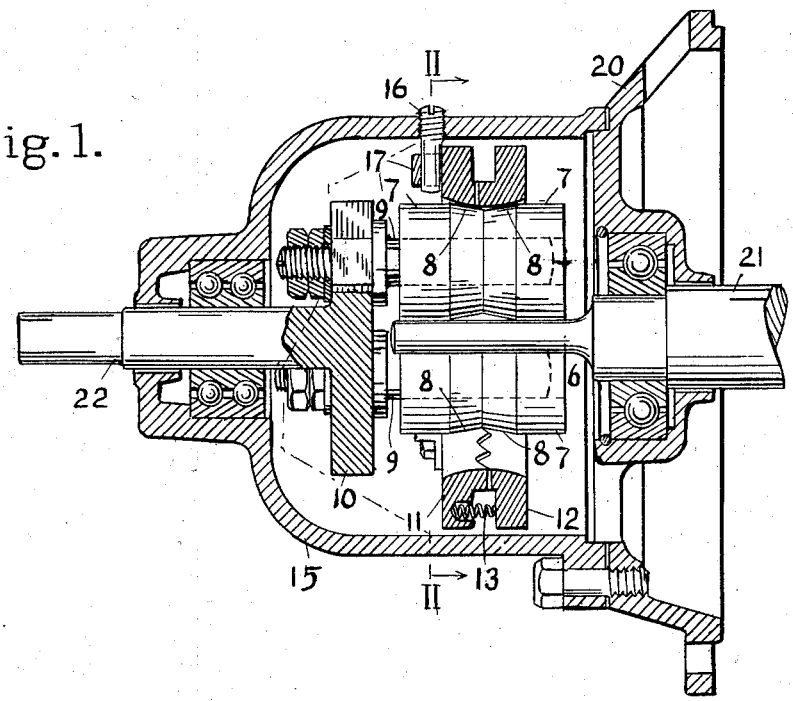
Figure 1 is a sectional elevation of a form of friction change speed gearing which embodies this invention.
Figure 2:
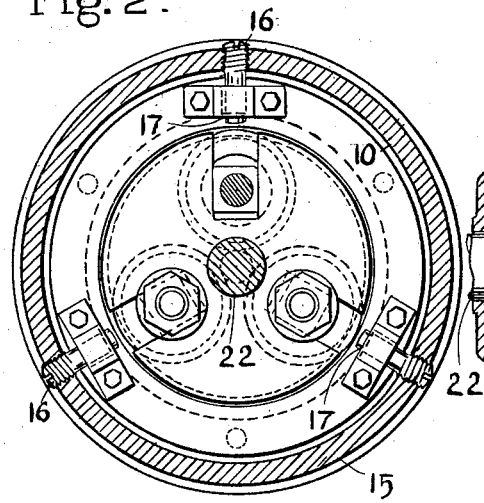
Fig. 2 is a transverse section on the line II—II of Figs. 1 and 3.
Figure 3:
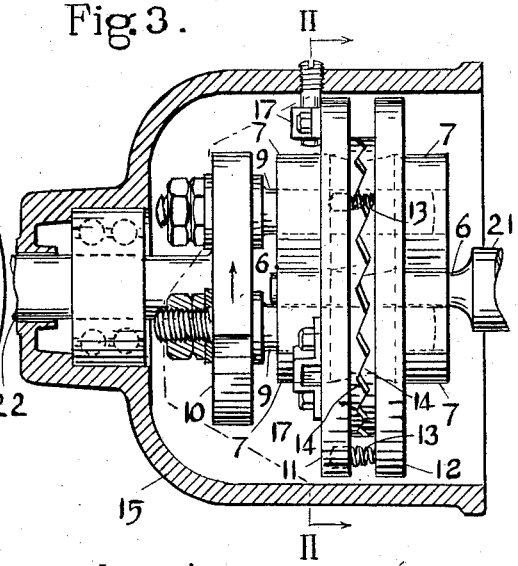
Fig. 3 is an elevation of the gearing with the casing in section.

The friction gearing as shown comprises a central cylindrical roller 6 and satellite rollers, each with cylindrical parts 7, 7 and with parts 8, 8 having beveled surfaces arranged in opposed pairs, that is to say, coned in opposite directions. The satellite rollers are carried on axles 9, 9 which are clamped in radial slots in a rotatable end plate 10.

Surrounding the satellite rollers is an outer race in two parts, one of which 11 is in engagement with one of the beveled surfaces of each of the satellite rollers and will be termed the fixed part, and the other of which 12 is in engagement with the other beveled surface of each of the satellite rollers and will be termed the movable part. Springs 13, 13 spread the parts so that there is a preliminary grip between the race and the satellite rollers. The two parts of the outer race have interengaging projections 14, 14 the sides of which are slightly inclined to the planes of the parts and constitute connections by which relative rotative adjustment in either direction concurrently effects a spreading of the parts or relative adjustment or pressure in the direction of their axes. Such spreading or pressure causes the race to be forced into frictional engagement or driving contact with the beveled surfaces of the satellite rollers, such force depending on the power which it is required to transmit. In turn this pressure through the satellite rollers increases the frictional engagement between the cylindrical parts of the satellite rollers and the central cylindrical roller.

In the construction here shown the parts are assembled and aligned with the axles for the satellite rollers at first left free to adjust radially in the slots in the end plate. The parts of the outer race are then spread to clamp the satellite rollers against the central roller and the nuts on the axles are set up to make them fast to the end plate. There is sufficient looseness in the bearings and elasticity in the axles to permit of such slight movement as may be necessary to permit of any further increase of pressure between the satellite rollers and the central roller which is required when transmitting power.

In order that the frictional engagement may be equalized throughout the mechanism, notwithstanding any differences in the diameters of the satellite rollers, or other irregularities, means are provided to restrain one of the parts of the outer race from rotating and to hold it substantially in a plane at right angles to the axis of the mechanism and restrained from displacement in the direction of the axis, but which will permit the outer race to assume a slightly eccentric position in any radial direction so that its axis may have a slight substantially parallel displacement to compensate for the irregularities. To provide this, a casing 15 for the gearing has radial pins 16, 16 which engage slots formed by straps 17, 17 that are attached to one of the parts of the outer race. The connection is such that there is a slight freedom for both a slight radial and circumferential adjustment at each pin so that radial adjustment at either pin will not be prevented at the other pins.

The mechanism as shown has been designed for use in connection with a dynamo-electric machine which may be either a motor or a generator, the casing being bolted to an end shield 20 of the machine, and the central roller of the gearing is formed on the end of the shaft 21 of the machine, which, if the machine is a motor, will be the driving shaft of the gearing, and which, if the machine is a generator, will be the following shaft of the gearing. The rotatable end plate is carried on a shaft 22 which is the slower shaft. It is the following shaft of the gearing if the gearing is used with a motor to transmit power to a slower running machine. It is the driving shaft of the gearing in case that is used in a transmission from a slow speed engine to a high speed generator.

We claim:—

1. Friction gearing of the type set forth with a central roller; satellite rollers having beveled surfaces, arranged in opposed pairs, in frictional engagement with the central roller; an outer race in two parts one of which is in engagement with one of the beveled surfaces and the other of which is in engagement with the other beveled surface of each of the satellite rollers; connections between the parts of the outer race by which they have relative rotative adjustment and concurrent relative adjustment in the direction of their axis; and means for restraining one of the parts of the outer race from rotation and holding it in a plane at right angles to the axis of the mechanism while permitting parallel displacement of its axis.

2. Friction gearing of the type set forth with a central roller; satellite rollers having beveled surfaces, arranged in opposed pairs, in frictional engagement with the central roller; an outer race in two parts one of which is in engagement with one of the beveled surfaces and the other of which is in engagement with the other beveled surface of each of the satellite rollers; connections between the parts of the outer race by which they have relative rotative adjustment and concurrent relative adjustment in the direction of their axis; a casing for the gearing; peripheral circumferentially extending slots in one of the parts of the outer race; and pins carried by the casing and engaging the slots whereby the part is held in a plane at right angles to the axis of the mechanism while parallel displacement of its axis is permitted.

HOWARD MAURICE EDMUNDS.
EDWARD HILEMAN WARING.